(12) United States Patent
Schwaiger

(10) Patent No.: US 6,565,345 B1
(45) Date of Patent: May 20, 2003

(54) PRESSING DEVICE FOR COMPRESSING METAL PARTS, IN PARTICULAR CHIPS

(75) Inventor: Helmut Schwaiger, Kirchdorf/Krems (AT)

(73) Assignee: TCG Unitech AG, Kirchdorf/Krems (AT)

( * ) Notice: Subject to any disclaimer, the term of this patent is extended or adjusted under 35 U.S.C. 154(b) by 0 days.

(21) Appl. No.: 09/341,812

(22) PCT Filed: Jan. 16, 1998

(86) PCT No.: PCT/AT98/00005

§ 371 (c)(1),
(2), (4) Date: Aug. 12, 1999

(87) PCT Pub. No.: WO98/31493

PCT Pub. Date: Jul. 23, 1998

(30) Foreign Application Priority Data

Jan. 20, 1997 (AT) .................................................. 74/97

(51) Int. Cl.[7] .................................................. B22F 3/20
(52) U.S. Cl. .............................. 425/78; 75/751; 75/770
(58) Field of Search ...................... 75/751, 770; 425/78

(56) References Cited

U.S. PATENT DOCUMENTS 3,757,410 A * 9/1973 Roberts ..................... 29/420.5
5,391,069 A   2/1995 Bendzick
5,524,534 A   6/1996 Dietel

FOREIGN PATENT DOCUMENTS

| DE | 80 27 473 | 4/1982 |
| DE | 32 46 251 | 9/1983 |
| DE | 43 19 361 | 12/1984 |
| DE | 94 04 311 | 6/1994 |
| EP | 0 130 277 | 1/1985 |
| FR | 2 274 369 | 1/1976 |

* cited by examiner

Primary Examiner—Daniel J. Jenkins
(74) Attorney, Agent, or Firm—Collard & Roe, P.C.

(57) ABSTRACT

The invention relates to an extrusion device (1) for compacting metal parts, in particular shavings (3), for example made of Fe, Cu, Mg or alloys of these elements or other low melting metals or their alloys, into homogenous extrusion mouldings with at least one extrusion unit with an extrusion die (5) formed by a die housing (9) which forms a die cavity (8) and has a guide arrangement for an extrusion element (7) adjustable by a drive device (6), and with an inlet opening (28) for the shavings (3) in the die housing (9), whereby a compression channel (18) is arranged opposite a front face of the extrusion element (7) facing the mould cavity (8) and adjacent to the mould cavity (8) in the direction of a passage surface (15) for a material strand (2).

32 Claims, 10 Drawing Sheets

PRESSING DEVICE FOR COMPRESSING METAL PARTS, IN PARTICULAR CHIPS

The invention relates to an extrusion device for compacting metal shavings to form homogenous extrusion mouldings, with at least one extrusion unit with an extrusion die formed by a die housing, which forms a mould cavity, a guide arrangement for an extrusion element adjustable by a drive device, and with an inlet opening for the shavings in the die housing.

From FR 2,274,369 A a device for extruding profiles made of residues or waste from aluminium or aluminium alloys is known. Because of the extensive use of such profiles, many residues are produced which can be recycles by the method described in FR-A and the device for performing the method. According to this method and the corresponding device, the cut up waste is subjected to a comprehensive pretreatment of cleaning and a pre-moulding is made for use in a press cylinder, for which the waste is filled into a cage-like covering made of the same material as the waste. The thus produced pre-mouldings are then heated to the necessary temperature and extruded through a profile-producing die. The disadvantage here is the very expensive pretreatment to obtain the necessary high quality of thus produced profiles.

From U.S. Pat. No. 5,391,069 A a compaction device for producing compact pellets made of metal shavings is known with a hydraulically drive extrusion stamp in a compaction chamber into which a screw conveyor device opens to supply shavings from a container. The compaction chamber has on its front face a driven flat slide, by means of which the former is optionally closed or opened on its face end opposite the die stamp. The disadvantage of this device is that the extrusion force for compacting the shavings is uniaxial and takes place against a flat reaction surface formed by the slide, by means of which the homogeneity in the extrusion moulding differs greatly between the core and circumferential area.

The object of the invention is to create an extrusion device, which is characterised by a high productivity and product quality, and in which the finished extrusion mouldings have a low moisture content and a homogenous composition.

The object of the invention is achieved with an extrusion device of the first-described type, wherein the extrusion die forming a conically tapering compression channel with a die opening forming a passage surface for a material strand is arranged opposite an outside face of the extrusion element facing the mould cavity and adjacent to the mould cavity, and the passage surface is smaller than a cross sectional surface of the mould cavity. The surprising advantage here is that an extrusion device for the shavings to be compacted is created in which the shavings are pressed against an extrusion die and are pushed through an extrusion opening, the passage surface of which is smaller than a cross sectional surface of the extrusion housing, whereby a demoisturising and a homogenous plastification of the shavings to form a continuous strand is achieved, and a simple die structure is achieved, and a division of the die into less stressed components and highly stressed components subjected to a large degree of wear is achieved.

The object of the invention is also to create an arrangement which is characterised by high productivity and product quality, in which the finished extrusion mouldings have a low moisture content and a homogenous composition. In addition, the storage of the shavings in a spatially delimited area should be possible and an even feeding of the extrusion device should be achieved, regardless of any fluctuations in amount, on the further transport of the shavings.

This object of the invention is achieved with an arrangement for compacting metal shavings made of Al, Cu, Mg or alloys of these elements or other low melting metals or their alloys, with at least one conveyor device for the shavings arranged in a storage device, which conveyor device is connected with an extrusion device, which comprises at least one extrusion unit, each unit having extrusion dies and extrusion elements adjustable relative thereto by drive devices. The extrusion dies have cylindrical cavities which are delimited at least partly by the die housings and a bore axis of a preextrusion housing mounting a preextrusion stamp is arranged at right angles to a middle axis of a main extrusion die. At least one die housing has an extrusion die arranged opposite the drive device, which extrusion die forms a conically tapering compression channel with a die opening having a passage surface which is smaller than a cross sectional surface of the die cavity. The surprising advantage here is that a good demoisturising and a homogenous plastification of the shavings into extrusion mouldings is achieved.

An embodiment according to claim 29 is also possible in which the reduction in size is made possible with simple means and with little wear.

A variant according to claim 30 is advantageous in which the extrusion mouldings can be brought into a shape, in which they can be conveyed in a simple manner for further processing.

An embodiment variant according to claim 31 is advantageous, in which compaction is not performed by oscillating movements but by continual movements and thus by the reduction or removal of time cycles the productivity and also the product quality is increased.

The embodiment variant according to claim 32 has the advantage that an even increase in pressure and thereby a continual compaction and plastification is achieved.

The invention also relates to an arrangement as described in the preamble of claim 49.

The objective of the invention is also to create an arrangement which is characterised by high productivity and product quality, in which the finished extrusion mouldings have a low moisture content and a homogenous composition. In addition, the storage of the shavings in a spatially delimited area should be possible and an even feeding of the extrusion device should be achieved, regardless of any fluctuations in amount, on the further transport of the shavings.

The objective of the invention is achieved by the characterising features of claim 49. The surprising advantage here is that a good demoisturising and a homogenous plastification of the shavings into extrusion mouldings is achieved.

Developments according to claim 34 are advantageous, which have the advantages of claims 3 to 49.

An embodiment variant according to claim 35 is advantageous, by which it is possible to loosen the shavings and it is thus avoided that in the storage container, in particular in the transition area between the storage container and conveyor device, a so-called bridge is formed which would prevent the continual inflow of shavings from the storage container to the conveyor device.

The variant described in claim 36 has the advantage that required high torques can be achieved in a simple manner.

An embodiment variant according to claim 37 is possible, in which the loosening of the shavings in the storage container is achieved by simple means.

A further development according to claim 38 has the advantage that for example during repair work a complete emptying of the storage container is not necessary.

Claim 39 describes a robust, conveyor device that is not susceptible to breakdown and is characterised by a even conveying performance.

By means of the characteristic described in claim 40, a module construction of the arrangement is achieved surprisingly easily, whereby the necessary storage costs for spare parts are reduced.

An embodiment variant according to claim 41 is also advantageous, in which the conveyor means are subjected to a tensile load and thus a buckling of the conveyor means in the conveying state, i.e. in the loaded state, is prevented.

A development according to claim 42 is also advantageous, in which the metal parts or shavings are already dried during the transport.

By means of the characteristics described in claim 43 in a simple manner a sealed connection is created between the conveyor device and the extrusion unit.

The invention also relates to a method as described in the preamble of claim 50.

The objective of the invention is to create a method which combines the contradictory aims of increasing productivity and improving quality.

This objective of the invention is described by the characterising measures in claim 50. The surprising advantage here is that thereby the production of extrusion mouldings is achieved with a low moisture content and a high degree of purity and thereby a very homogenous composition. This makes it possible for the thus obtained extrusion mouldings to be fed to a melting process, to which only a low percentage of new materials have to be added in order to produce new parts and machine elements in a casting or injection moulding procedure, by means of which an economic utilisation of the shavings is achieved and the production of environmentally polluting special waste is avoided to a large degree.

The invention is described in more detail by way of embodiments described in the Figures.

Shown are.

First of all, it should be noted that in the different described embodiments the same parts are given the same reference numbers or same component names, whereby that which is disclosed throughout the description can be applied to the same parts with the same reference numbers or same component names. Furthermore, individual characteristics of the various shown embodiments can represent independent solutions according to the invention.

Figure 1:
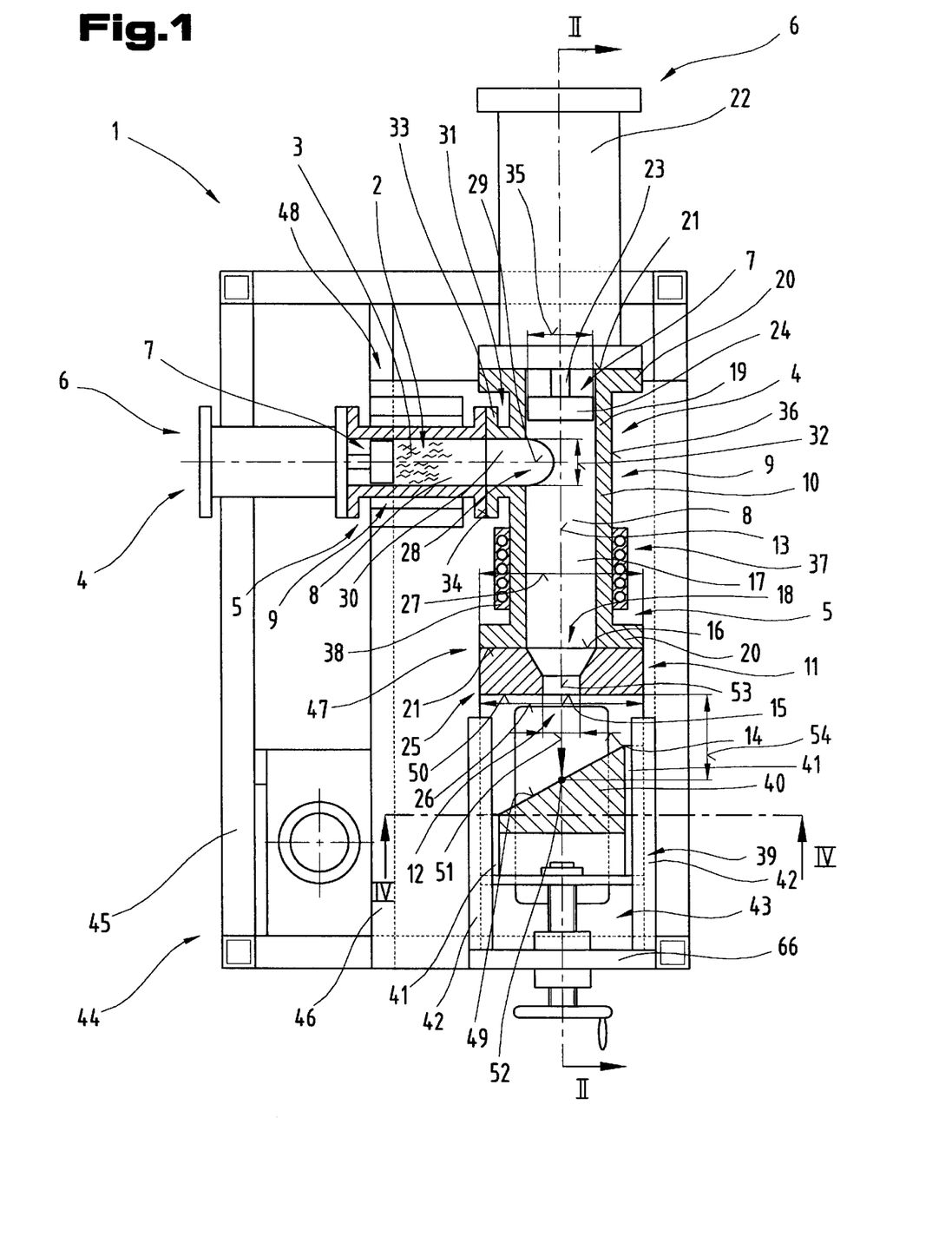
FIG. 1 an extrusion device according to the invention, partly in cross section, in plan view.
Figure 2:
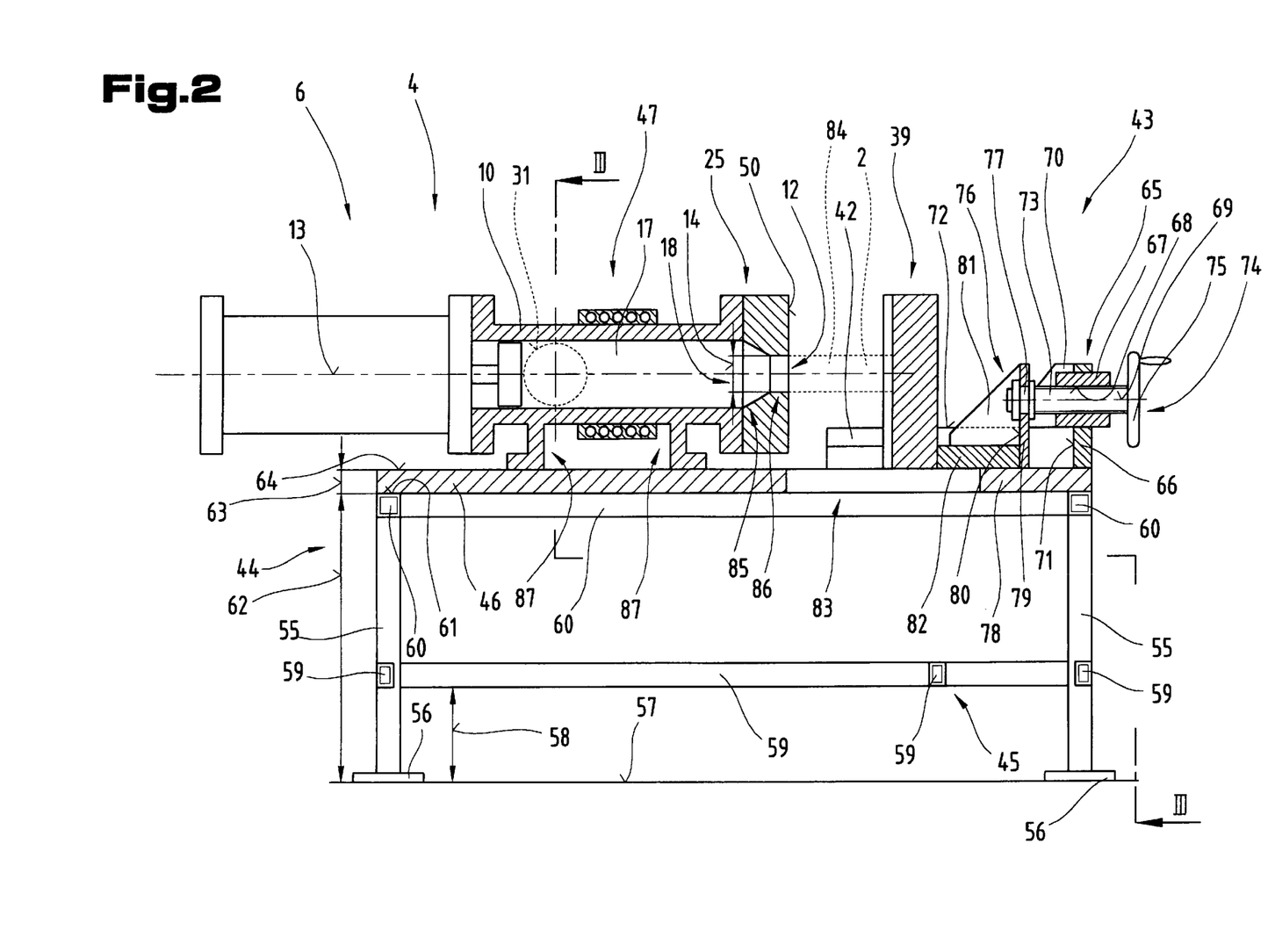
FIG. 2 the extrusion device, in cross section, along the lines II—II of FIG. 1.
Figure 3:
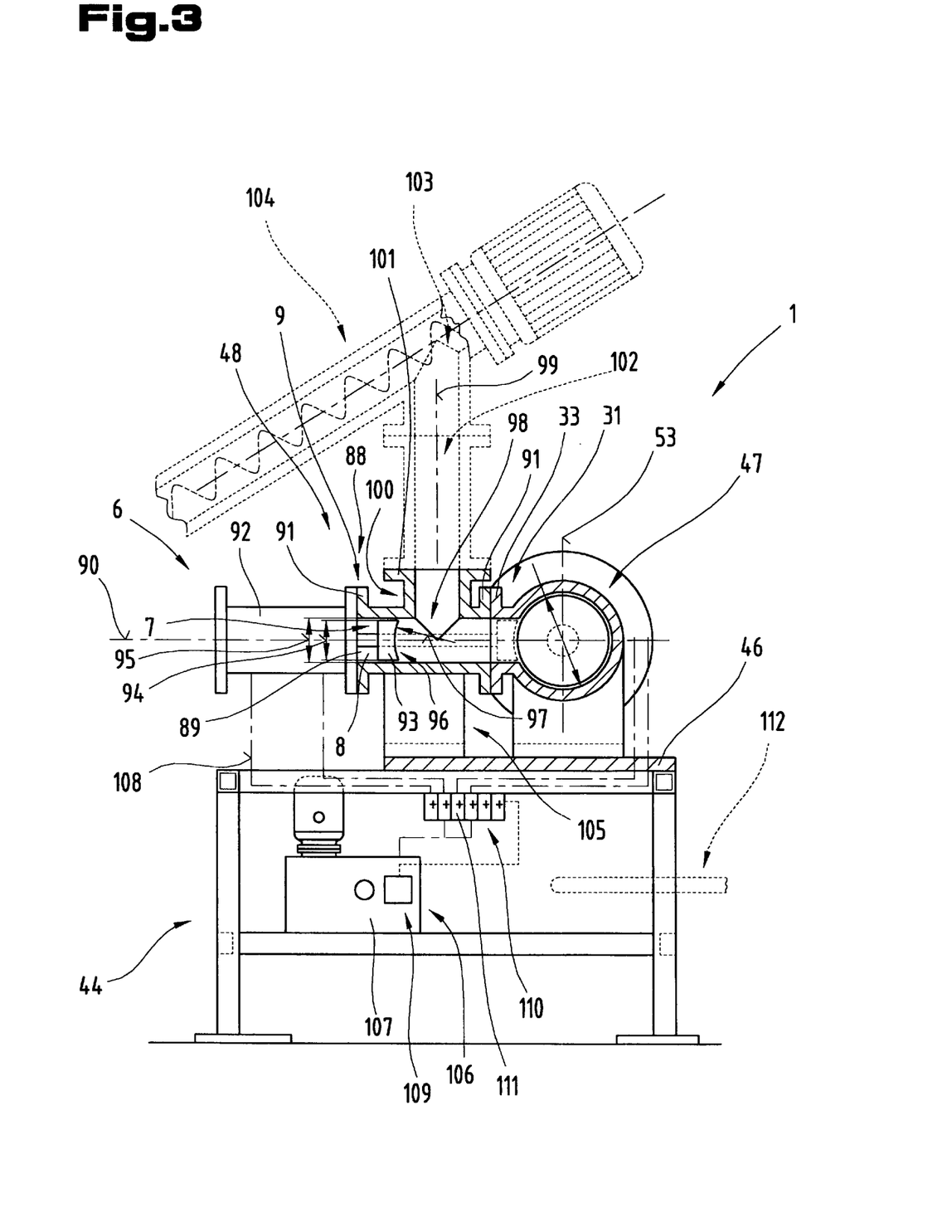
FIG. 3 the extrusion device, in cross section, along the lines III—III of FIG. 2.

In the jointly described FIGS. 1 to 3 an extrusion device 1 is shown for producing a material strand 2 by compacting shavings 3, which for example are made of Al, Cu, Mg or alloys of these elements or other low melting metals or their alloys. The extrusion device 1 comprises in the present embodiment two extrusion units 4, which comprise extrusion dies 5 and extrusion elements 7, e.g. extrusion stamps, that are adjustable relative to the extrusion dies 5, preferably by pressure media-operated drive devices 6. The extrusion dies 5 preferably have cylindrical mould cavities 8, which are partly delimited by die housings 9. A die housing 9, which forms a main extrusion housing 10, has an extrusion die 11 opposite the drive device 6, which preferably has a circular die opening 12 arranged concentrically to the longitudinal middle axis 13. The die opening 12 has a die inner diameter 14 concentric to the longitudinal middle axis 13 which surrounds a passage surface 15 of the die opening 12 in opposite direction to the longitudinal middle axis 13, which diameter surrounds a passage surface 15 of the die openings 12 in opposite direction to the longitudinal middle axis 13. The passage surface 15 is smaller than a cross sectional surface 16 of the main extrusion cavity 17 forming the mould cavity 8 of the main extrusion housing 10. In this way in the extrusion die 11 a compression channel 18 tapering conically from the main extrusion cavity 17 in the direction of the passage surface 15 is formed, in which high pressure forces act on the circumference of the material strand 2 during the discontinual pressing through of the material strand 2 by the extrusion element 7 depending on the angle of conicity, whereby depending on the pressing force and on the external effect of temperature a high degree of homogenisation is achieved in the material strand 2.

The main extrusion housing 10 has for example a tubular housing section 19 which is delimited at opposite ends by flanges 20. The drive device 6, designed in particular as a hydraulic cylinder 22, is arranged on a flange front face 21 lying in a plane at right angles to the longitudinal middle axis 13. A cylinder rod 23 concentric to the longitudinal middle axis 13 projects over the flange front face 21 in the direction of the extrusion die 11 opposite the latter, and has a main extrusion stamp 24 forming the extrusion element 7, which is adjustable linearly along the longitudinal middle axis 13 in the main extrusion cavity 17. On the flange 20 of the main extrusion housing 10 opposite the drive device 6 a main extrusion doe 25 forming the extrusion die 11 is arranged, which projects over a flange front face 21 facing away from the flange 20 of the drive device 6 opposite the drive device 6. Said main extrusion die 25 has a die external diameter 26 in a plane at right angles to the longitudinal middle axis 13, which corresponds approximately to a flange external diameter 27 of the flange 20 running approximately parallel thereto. In the housing section 19 of the main extrusion housing 10 there is an inlet opening 28, which is concentric to an opening axis 29, which is preferably arranged at right angles to the longitudinal middle axis 13. From the inlet opening 28 in opposite direction to the main extrusion piston 17 a inlet channel 30 arranged concentrically relative to the opening axis 29 extends which is bordered by an inlet connection 31 arranged immobily on the housing section 19. The inlet connection 31 has an inlet diameter 32 delimiting the inlet channel 30 and the inlet opening 28 in a plane at right angles to the opening axis 29 which is smaller for example than the cross section of the main extrusion cavity 17. Furthermore, the inlet connection 31 has a connection flange 33 parallel to the inlet diameter 32 which is delimited in opposite direction to the main extrusion housing 10 by a connection outer face 34 parallel to the inlet diameter 32.

The main extrusion stamp 24 is delimited by a stamp diameter 35 measured at right angles to the longitudinal middle axis 13, which corresponds approximately to the cross section of the main extrusion cavity 17. The main extrusion housing 10 also has a heating device 37 on an outer surface 36 which delimits the housing section 19 opposite the main extrusion cavity 17. The latter is preferably in the form of one or more electrical heating strips 38, wherein the heating device 37 of the main extrusion housing 10, is arranged, in particular between the flange 20 assigned to the main extrusion die 25 and the inlet connection 31.

Spaced apart from the main extrusion die 25 in opposite direction to the drive device 6 is a size reducing device 39 for the material strand 2. The size reducing device 39 comprises a leading element 40, which has guide webs 41 arranged symmetrically Or about the longitudinal middle axis 13. The guide webs 41 are mounted in guide rails 42 and are linearly movable in parallel direction relative to the longitudinal middle axis 13 by means of an adjusting device 43. The extrusion device 1 also has a frame 44, which is made of profile elements 45, for example hollow profiles. Furthermore, the frame 44 has a bearing plate 46 connected securely to the profile elements 45, on which bearing plate the extrusion dies 5 can be arranged, in particular a main extrusion die 47 formed by the main extrusion housing 10 and the main extrusion die 25 and a preextrusion die 48 arranged at the inlet connection 31 and the size reducing device 19 and the adjusting device 43.

The leading element 40 of the size reducing device 39 has a sliding surface 49 which faces a front surface 50 delimiting the main extrusion die 25 opposite the drive device 6, and is arranged at an angle to a main extrusion direction—arrow 51. The leading element 40, in particular a line of intersection 52 on the sliding surface 49 at right angles to the bearing plate 46 formed by the intersection of a longitudinal middle plane 54 at right angles to the bearing plate 46 in a longitudinal middle plane 53 and the sliding surface 49, is spaced apart from the front surface 50 of the main extrusion die 25 by a distance 54 measured parallel to the main extrusion direction—arrow 51.

The frame 44 comprises vertical profiles 55, which are arranged detachably or undetachably by foot plates 56 on a horizontal bearing surface 57. At a distance 58 at right angles to the bearing surface 57 connecting profiles 59 run parallel to the bearing surface 57 which are connected securely to the vertical profiles 55. Horizontal profiles 60 are also connected securely to the vertical profiles 55, which horizontal profiles have an upper side 61 parallel to the bearing surface 57 and spaced apart from the latter by a frame height 62 measured at right angles to the bearing surface 57. On the upper side 61 projecting over the latter opposite the bearing surface 57 is the bearing plate 46, which has a plate thickness 63 measured parallel to the frame height 62 from the upper side 61 in opposite direction to the bearing surface 57, which plate thickness spaces a bearing plane 64 delimiting the bearing plate 46 opposite the bearing surface 57 from the upper side 61.

The adjusting device 43 arranged on the bearing plate 46 has a bracket 65, which comprises a bracket plate 66 projecting at right angles to the bearing plane 64 and a spindle nut 67 connected securely therewith. The bracket plate 66 is here arranged at right angles to the longitudinal middle plane 53. The spindle nut 67 is preferably cylindrical in design and has an internal thread 68, which is arranged concentrically about a spindle axis 69 parallel to the bearing plane 64 and preferably in the longitudinal middle plane 53. Furthermore, the bracket 65 has a reinforcing plate 70, which projects over a plate front face 71 at right angles to the bearing plane 64 in the direction of the extrusion unit 4, and which is connected securely to the plate front face 71 and a rail surface 72 of the guide rails 42 parallel to the bearing plane 64.

In the spindle nut 67, in particular in the internal thread 68, there is a spindle 73 which has in an end region opposite the extrusion unit 4 a drive element 74, for example in the form of a handwheel 75. The spindle 73 in an end region 76 facing the extrusion unit 4 is rotatably mounted by a bearing device 77 in a guide bracket 78 which is formed by a transverse plate 79 parallel to the bracket plate 66. On an inner side 80 at right angles to the bearing plane 64 opposite the bracket 65 the transverse plate 79 has reinforcing ribs 81, which are connected to a plate 82 of the size reducing device 39. The bearing plate 46 has an opening 83, through which the material strand 2, shown by broken lines, projecting over the front surface 50 of the main extrusion die 25, has been cut into extrusion mouldings 84, which fall in the direction of the bearing surface 57.

The main extrusion die 25 has the already described die opening 12. The latter comprises a conical section 85 adjacent to the main extrusion cavity 17 and forming the compression channel 18 and a cylindrical section 86, which extends from the conical section 85 in the direction of the size reducing device 39. The cylindrical section 86 is concentric to the longitudinal middle axis 13 and has the die inner diameter 14. The conical section 85 tapers from the cross section of the main extrusion cavity 17 to the die inner diameter 14. The main extrusion housing 10 also has foot brackets 87 connected securely therewith, by means of which the main extrusion die 47 is connected securely to the frame 44.

Of course, it is possible, to design the adjusting device 43 to be not only manually but also electrically activated, in particular by an electric motor or hydraulically.

The main extrusion die 47, in particular the main extrusion housing 10, has as already described, the inlet connection 31. The preextrusion die 48 is arranged on the latter.

The preextrusion die comprises the die housing 9, which is designed as a preextrusion housing 88. The preextrusion housing 88 delimits at least partly a preextrusion cavity 89 forming the mould cavity 8 and has flanges 91 concentric to a middle axis 90 running preferably at right angles to the longitudinal middle plane 53. The flange 91 of the main extrusion die 47 is in this case connected securely to the connection flange 33 of the inlet connection 31, whilst the flange 91 facing away from the main extrusion die 47 is connected to the drive device 6, in particular to a flange of a hydraulic cylinder 92. It is also possible however to arrange the preextrusion housing 88 directly on the main extrusion housing 10 without the inlet connection 31.

In the preextrusion cavity 89 is a preextrusion stamp 93 forming the extrusion element 7, which is preferably cylindrical and has a cylinder diameter 94 concentric to the middle axis 90 which corresponds approximately to a cross sectional diameter 95 delimiting the preferably cylindrical preextrusion cavity 89 in the direction of the middle axis 90. The preextrusion stamp 93 is mounted linearly movably along the middle axis 90 in the preextrusion cavity 89. The preextrusion stamp 93 has a pressing surface 96 facing the main extrusion die 47, which is concave and has a radius 97 measured from a middle point of the middle axis 90, which is approximately half the cross section of the main extrusion housing 10.

The preextrusion housing 88 has an inlet opening 98 with a bore axis 99 which runs at right angles to the middle axis 90 and for example at right angles to the bearing plane 64. Concentric to the bore axis 99 is a inlet connection 100 which surrounds the inlet opening 98 and has an inlet flange 101 concentric to the bore axis 99 and parallel to the bearing plane 64. A discharge chute 102 is arranged at the inlet connection 100 and projects over the latter in opposite direction to the preextrusion housing 88, and said discharge chute also connects the inlet opening 98 with an outlet opening, 103 of a conveyor device 104. Said conveyor device 104 can for example be designed as a screw conveyor, as a spiral screw conveyor, as a chain conveyor or as a belt conveyor. The preextrusion housing 88 also has foot brackets 105, which connect the preextrusion housing 88 to the bearing plate 46. It is also possible however to connect the conveyor device 104 directly to the preextrusion housing 88 without the interconnection of a discharge chute 102, or if the extrusion device 1 has only one main extrusion die 47 to the main extrusion housing 10.

In the frame 44 is a power supply device 106, for example a hydraulic unit 107, which provides the drive devices 6, for example the hydraulic cylinder 92, with energy, in particular pressure energy, via a line 108. Furthermore, a control device 109 can be arranged on the power supply device 106 or on the frame 44 to control switching elements 110, in particular hydraulic valves 111. Furthermore, in the frame 44 an end part of a transport device 112 shown by broken lines or a container for the extrusion mouldings 84 can be arranged.

Figure 4:
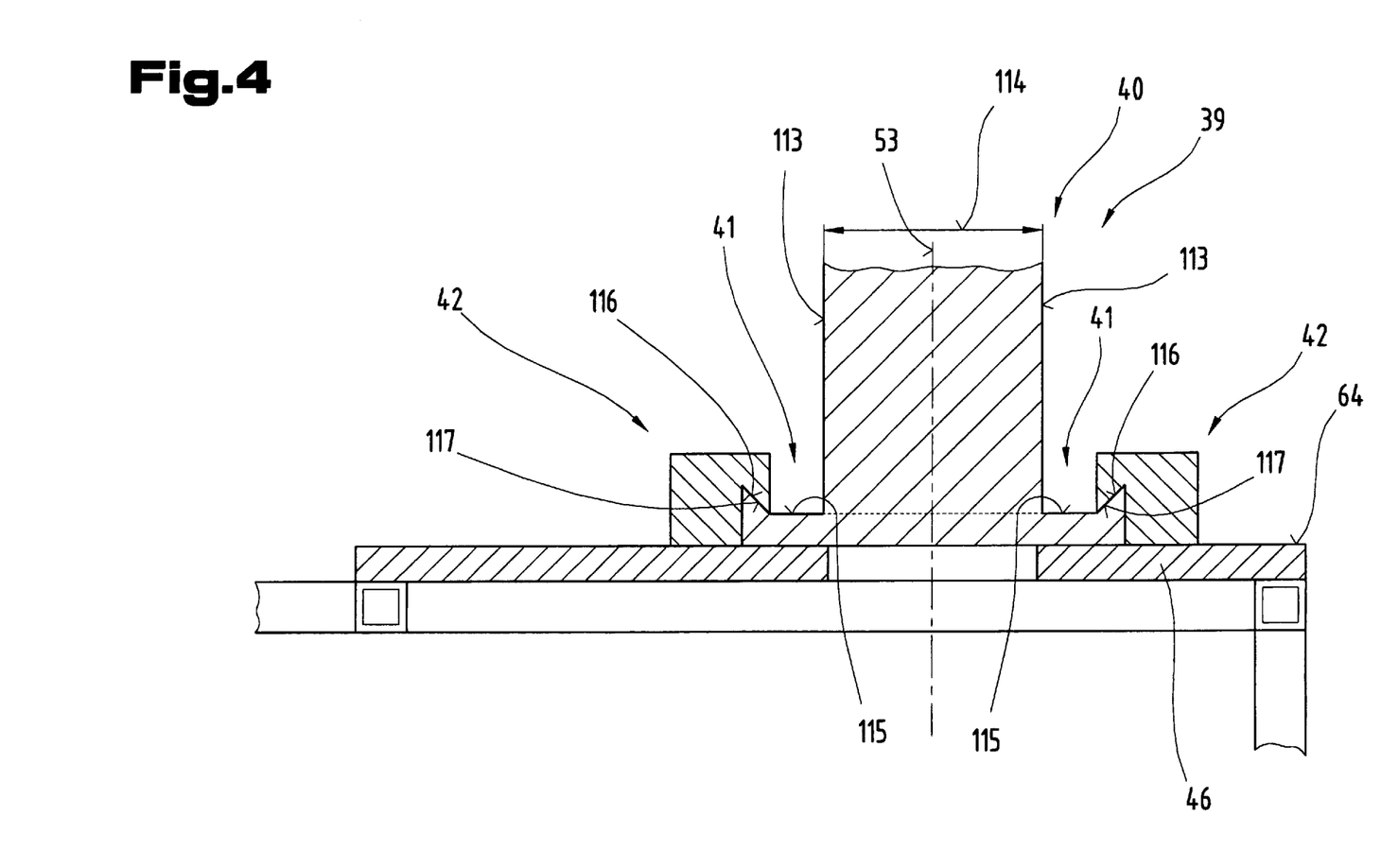
FIG. 4 a part section of the extrusion device according to the invention, in cross section, along the lines IV—IV of FIG. 1.

In FIG. 4 the size reducing device 39 is shown in cross section. It can be seen that the leading element 40 is defined by side surfaces 113 running parallel to the longitudinal middle plane 53 which are spaced apart by a width 114. The guide webs 41 project over the side surfaces 113 opposite the longitudinal middle plane 53. Facing away from the bearing plane 64 and parallel thereto the guide webs 41 are delimited by surfaces 115 and at right angles thereto by front side surfaces 116. The guide rails 42 are arranged assigned to the guide webs 41, preferably connected to the bearing plate, which with a recess running in longitudinal direction form guide surfaces 117, by means of which a very stable guiding of the adjustable leading element 40 is achieved. Of course, it is possible to design any type of guide from a plurality of technical possibilities, such as e.g. prismatic guides, dovetail guides etc.

Figure 5:
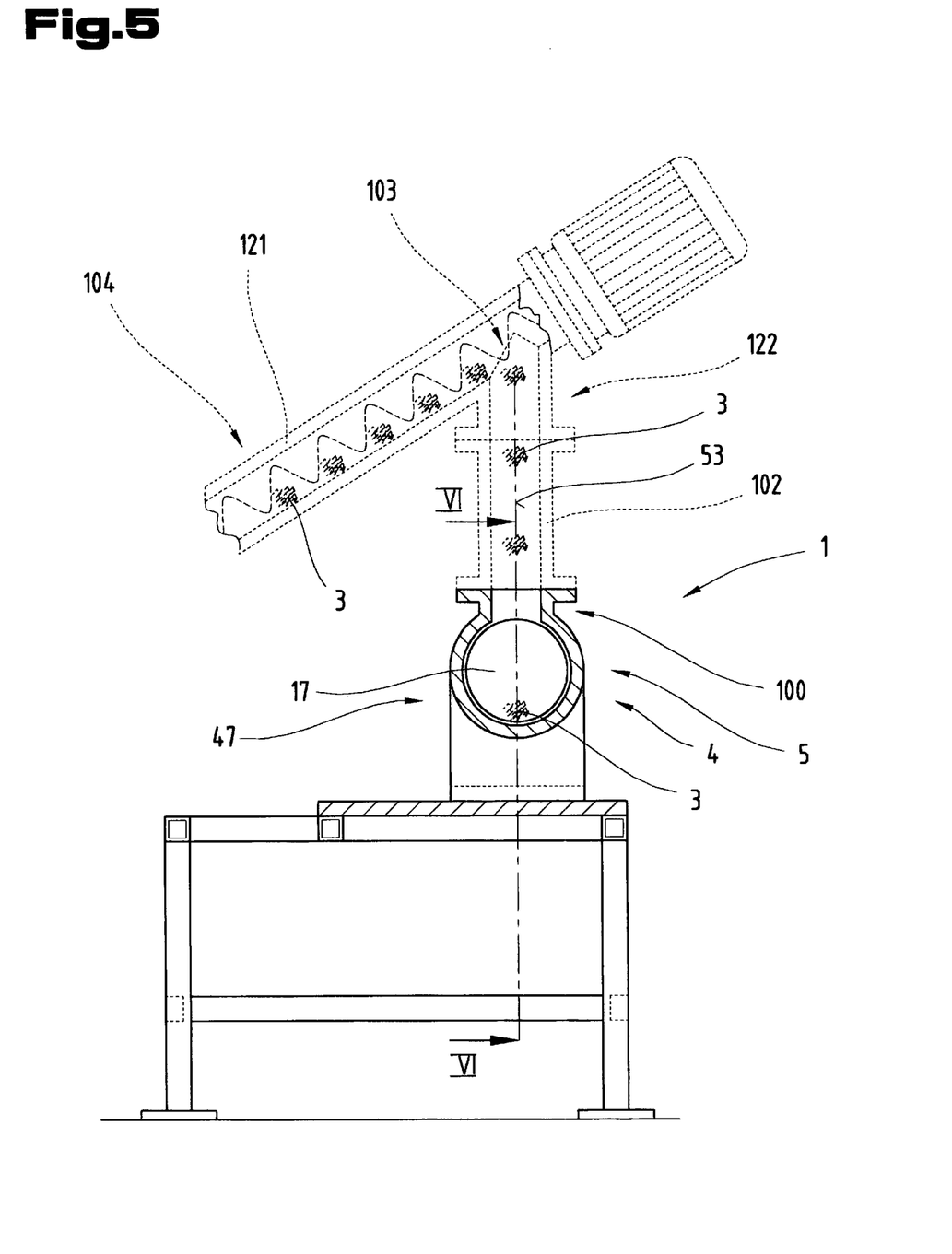
FIG. 5 a further embodiment variant of an extrusion device according to the invention, partly in cross section, in front elevation.
Figure 6:
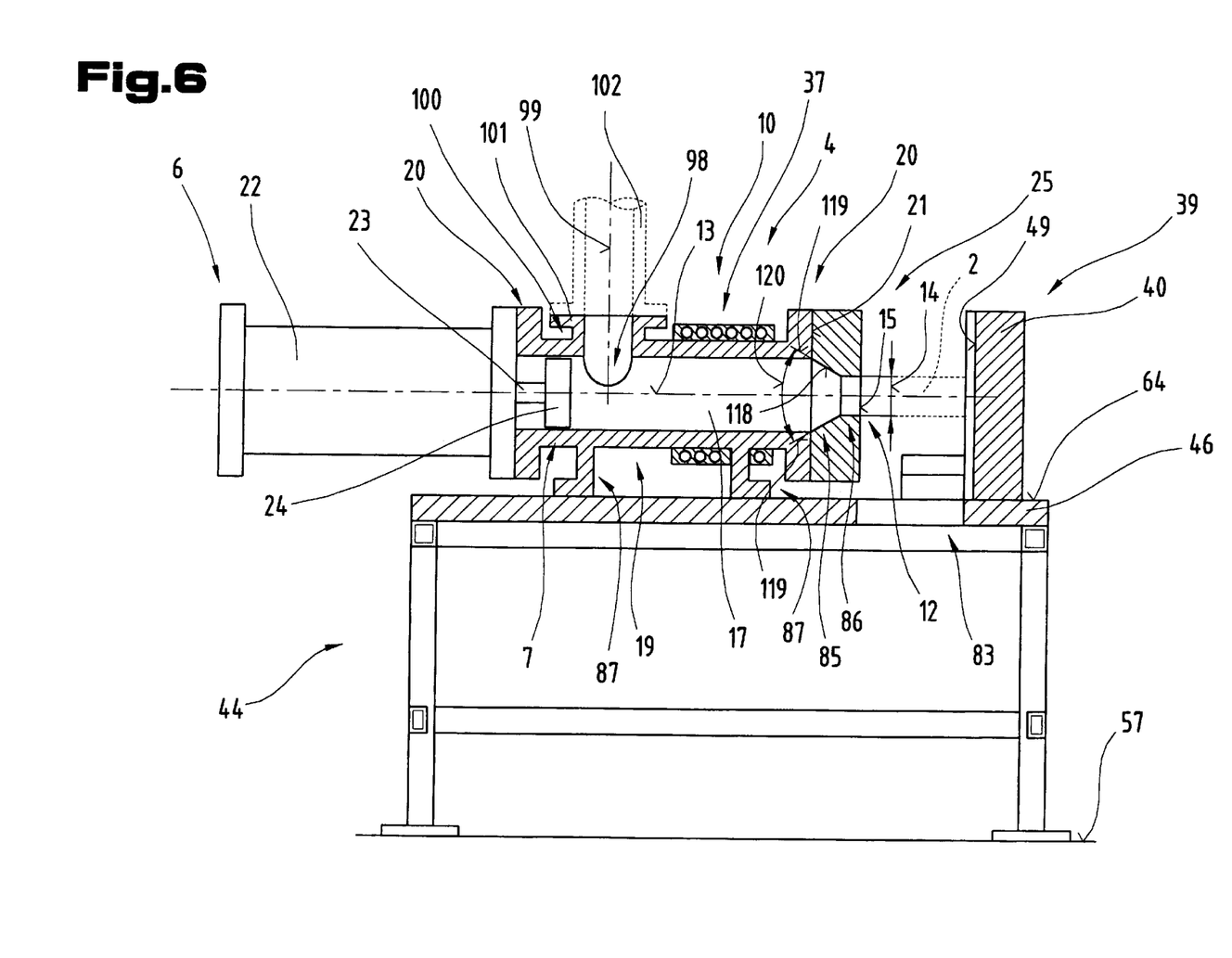
FIG. 6 the extrusion device according to the invention, in cross section, along the Lines IV—IV of FIG. 5.

In the jointly described FIGS. 5 and 6 a further embodiment of the extrusion device 1 with a single extrusion unit 4 is shown. The extrusion unit 4 here comprises the extrusion die 5, in particular the main extrusion die 47, which comprises the main extrusion housing 10 comprising the housing section 19 and the flanges 20. On one flange 20, in particular on the flange front face 21, which is at right angles to the longitudinal middle axis 13, the main extrusion die 25 with the die opening 12 is arranged. On the flange 20 of the main extrusion housing 10 arranged opposite the main extrusion die 25 the drive device 6, for example in the form of a hydraulic cylinder 22, is arranged, which by means of a cylinder rod 23 moves the main extrusion stamp 24 designed as the extrusion element 7 linearly along the longitudinal middle axis 13 in the main extrusion cavity 17 delimited by the main extrusion housing 10. The main extrusion housing 10 is in turn arranged by means of foot brackets 87 on the bearing plate 46 mounted by the frame 44. Contrary to the previous examples the main extrusion housing 10 has the inlet opening 98, the bore axis 99 of which is arranged for example at right angles to the longitudinal middle axis 13 and to the bearing plane 64 of the bearing plate 46. The inlet opening 98 is delimited by an inlet connection 100, which is arranged concentrically about the bore axis 99. The input connection 100 has the inlet flange 101, which is parallel to the bearing plane 64 and on which the discharge chute 102, shown by broken lines, is arranged, the size reducing device 39 in the form of the leading element 40 is spaced apart from the main extrusion die 25.

The size reducing device 39 can however also be designed as a rigid or "floating" saw. The die opening 12 in turn comprises a conical section 85 and a cylindrical section 86 which is delimited by the die inner diameter 14. The conical section 85 has a casing surface 118, which runs annularly around the longitudinal middle axis 13 and decreases from the cross section of the main extrusion housing 10 to the die inner diameter 14. Here the tangential lines 119 of the casing surface 118 are arranged, which run in the longitudinal middle plane 53, so that they form a cone angle 120 of 10° to 20°, preferably 16°. The main extrusion housing 10 can also have one or more outlet openings, through which the liquid removed from the mixture of shavings 3, for example the cooling water, bore water or grinding water, is extracted on the main pressing cavity 17. Such outlet openings can also be made in the preextrusion housing 88 also shown in FIG. 3.

The shavings 3 to be compacted are now transported by the conveyor device 104, and are conveyed through the outlet opening 103 arranged in a conveyor housing 121 of the conveyor device 104, which outlet opening is delimited by an outlet connection 122 connected to the conveyor housing 121, to the discharge chute 102 which is connected securely to the inlet connection 100. By means of this inlet connection 100 the shavings 3 enter the main extrusion cavity 17 and means of by the extrusion element 7 moved by the drive device 6 in the direction of the main extrusion die 25 are pressed against the latter. At a specific pressure or extrusion force and with an increase in temperature generated by the heating device 37 a compression and flow movement occurs on the casing surface 118 along the tangential lines 119 in the direction of the die opening 12, and on further compression the material strand 2 exits the die opening 12 in the direction of the size reducing device 39. If the compacted shavings 3 now reach the sliding surface 49 of the leading element 40 facing the main extrusion die 25 the compacted shavings 3 are deflected, whereby an opening is made in the region of the passage surface 15 of the die opening 12. The compacted shavings 3 fall through the opening 83 in the direction of the bearing surface 57, where they can be collected up and transported off.

Figure 7:
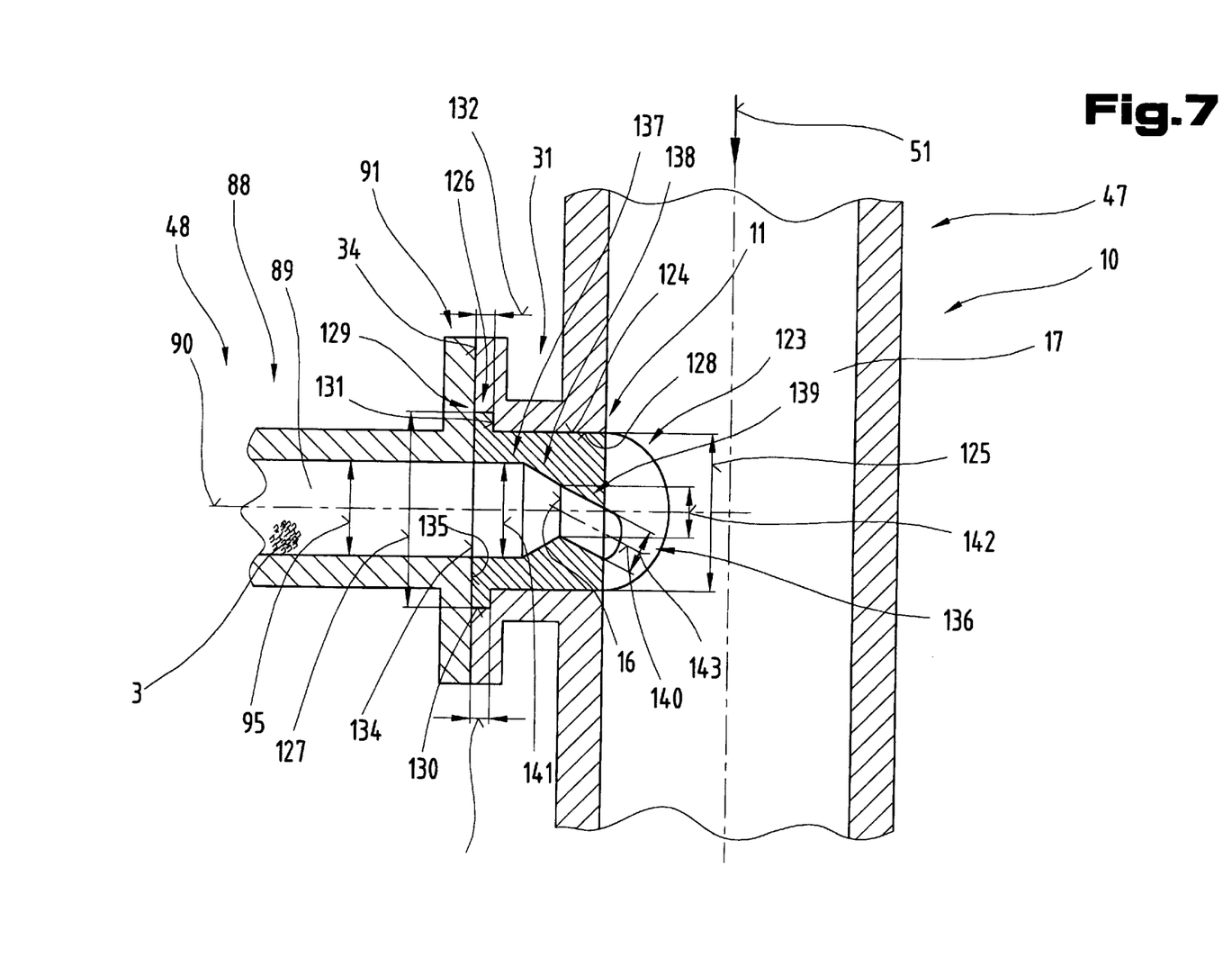
FIG. 7 a part section of a further embodiment variant of an extrusion device according to the invention, in particular of the preextrusion die and the main extrusion die, in cross section, in plan view.

In FIG. 7 a further embodiment variant of an extrusion die 11 is shown, in particular a preextrusion die 123. It is designed in particular to be cylindrical and has a cylinder casing surface 124 concentric to the middle axis 90, which surface is delimited by a casing diameter 125. In a region facing the preextrusion housing 88 the preextrusion die 123 has a shoulder 126 running concentrically about the middle axis 90 which is delimited by the shoulder diameter 127. The latter is larger than the casing diameter 125. The preextrusion die 123 is for example arranged in the inlet connection 31, wherein the cylindrical casing surface 124 bears on a cylindrical connection inner surface 128 concentric to the middle axis 90. It is delimited by a diameter which is equal to or larger than the casing diameter 125.

The inlet connection 31 also has a shaping 129 for the shoulder 126 which is delimited by a shoulder surface 130 concentric to the middle axis 90 and an annular surface 131 in a plane at right angles to the middle axis 90. The annular surface 131 is spaced apart from the connection outer face 34 of the inlet connection 31 by a depth 132 in the direction of main extrusion housing 10, which is equal to or greater than a shoulder width 133 parallel thereto which has a shoulder front face 134 facing the preextrusion housing 88 which lies in a plane at right angles to the middle axis 90 and spaces apart the annular surfaces 131. The connection outer face 34 and/or the shoulder front face 134 thus lie flush on a flange front face 135 of the flange 91 of the preextrusion housing 88.

The preextrusion die 123 in turn has die opening 136, which comprises a cylindrical section 137 running concentrically about the middle axis 90 and arranged adjacent to the flange 91 of the preextrusion housing 88, a conical section 138 adjoining the latter in the direction of the main extrusion housing 10 and an inclined channel 139 running from the conical section 138 in the direction of the main extrusion housing 10. The inclined channel 139 has a channel axis 140 which runs at an angle to the middle axis 90 from the conical section 138 in opposite direction to the not shown drive device 6 of the main extrusion die 47. The cylindrical section 137 has a section diameter 141 concentric to the middle axis 90, which corresponds with the cross sectional diameter 95 of the preextrusion cavity 89 of the preextrusion housing 88. The conical section 138 tapers in the direction of the main extrusion cavity 17 of the main extrusion housing 10 up to a die inner diameter 142, which corresponds approximately to a channel diameter 143 measured at right angles to the channel axis 140.

Because of this construction of the preextrusion die the latter is designed to be replaceable, and in addition the shavings 3 located in the preextrusion cavity 89 are already plastified homogeneously in the preextrusion die 48 and also are steered in the direction of the main extrusion direction— arrow 51 —, thus ensuring a high degree of effectiveness of the subsequent compaction in the main extrusion die 47.

Figure 8:
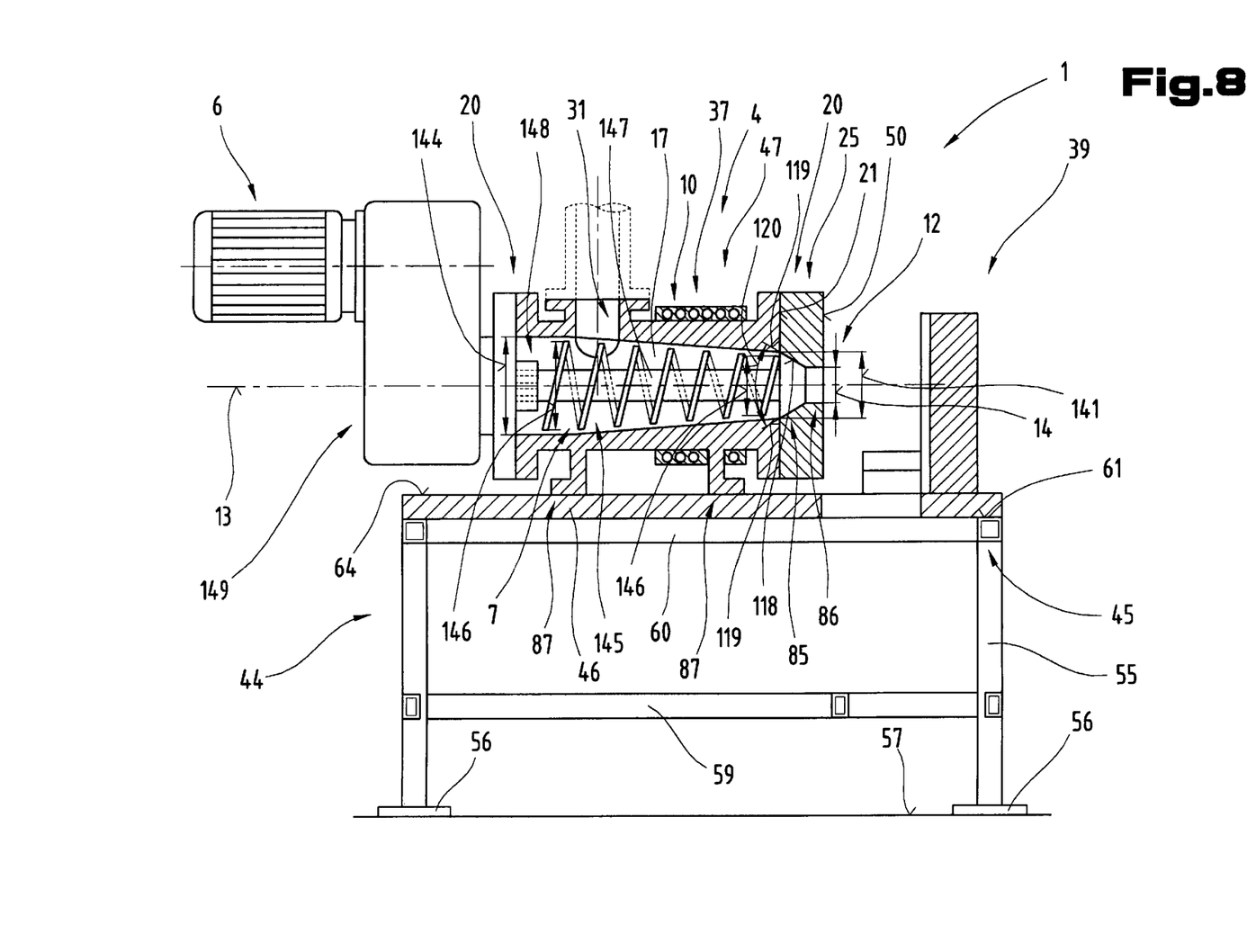
FIG. 8 a different embodiment of the extrusion device according to the invention, in cross section, in side view.

In FIG. 8 a further embodiment of an extrusion device 1 according to the invention is shown. The latter comprises the frame 44 which comprises profile elements 45, in particular vertical profiles 55, which are connected by foot plates 56 to a bearing surface 57, and horizontal profiles 60. Furthermore, the frame 44 comprises connecting profiles 59. On an upper side 61 of the frame 44 running parallel to and opposite the bearing surface 57 the bearing plate 46 is arranged, which forms the bearing plane 64 running parallel to the bearing surface 57 for at least one extrusion unit 4. The extrusion unit 4 comprises in the present example the main extrusion die 47, comprising the main extrusion housing 10 and the main extrusion die 25. The main extrusion die 25 has in turn the die opening 12, which is arranged concentric to the longitudinal middle axis 13 and has a conical section 85 and a cylindrical section 86 in opposite direction to a drive device 6. The cylindrical section 86 is here designed as a bore with a die inner diameter 14. In opposite direction to the drive device 6 the size reducing device 39 is spaced apart from the front surface 50 of the main extrusion die 25, which is at right angles to the bearing plane 64 and delimits the main extrusion die 25 opposite the drive device 6. The conical section 85, in particular its casing surface 118, has in a plane running at right angles to the bearing plane 64 tangential lines 119, which run from an intersection with delimiting lines of the die inner diameter 14 in the direction of the drive device 6 and widen outwards forming a conical angle 120 of the conical section 85.

In the region of the flange front face 21 of the flange 20 of the main extrusion housing 10 facing away from the drive device 6, the conical section 85 has the section diameter 141, which is greater than the die inner diameter 14. The latter corresponds to the cross section of the truncated cone-shaped main extrusion cavity 17 in the present embodiment. This means that the main extrusion cavity 17 runs concentrically about the longitudinal middle axis 13 and widens from the cross section in the direction of the drive device 6, and in the region of the flange 20 adjacent to the drive device 6 has an inner diameter 144 which is greater than the cross section. In the truncated cone-shaped main extrusion cavity 17 is a screw 145, in particular in the form of a conical screw, which forms the extrusion element 7. The latter has in the region of the drive device 6 flange 20 of the main extrusion housing 10 an external diameter 146 which is slightly smaller than the inner diameter 144 and decreases in the direction of the main extrusion die 25 and in the region of the main extrusion die 25 flange 20 has an external diameter 146, which is smaller than the cross sectional diameter. The screw also has a screw axis 147, which runs in the direction of the longitudinal middle axis 13 and is arranged in cross section concentrically about the longitudinal middle axis 13. It preferably follows a cylindrical path. It can however also be adjusted to the truncated cone shaped path of the screw 145 and taper conically from the drive device 6 to the main extrusion die 25. The screw 145 is connected by a coupling and/or storage device 148 to the drive device 6 which in the present example can be in the form of a cylindrical gear motor 149. Furthermore, the main extrusion housing 10 has the inlet connection 31 and the heating device 37 and is connected by foot consoles 87 to the bearing plate 46.

Of course, the screw 145 can also be designed in cylindrical form. Also a design is possible in which such a screw 145 having a cylindrical outer casing is additionally adjustable by a drive device in the housing in the direction of its longitudinal extension, and thereby on the one hand a conveying of the shavings 3 in the direction of the conical section 85 is performed and on an adjustment of the screw 145 in the direction of the conical section 85 an additional pressurising is performed to compact the shavings 3 and form the homogenous material strand 2.

Figure 9:
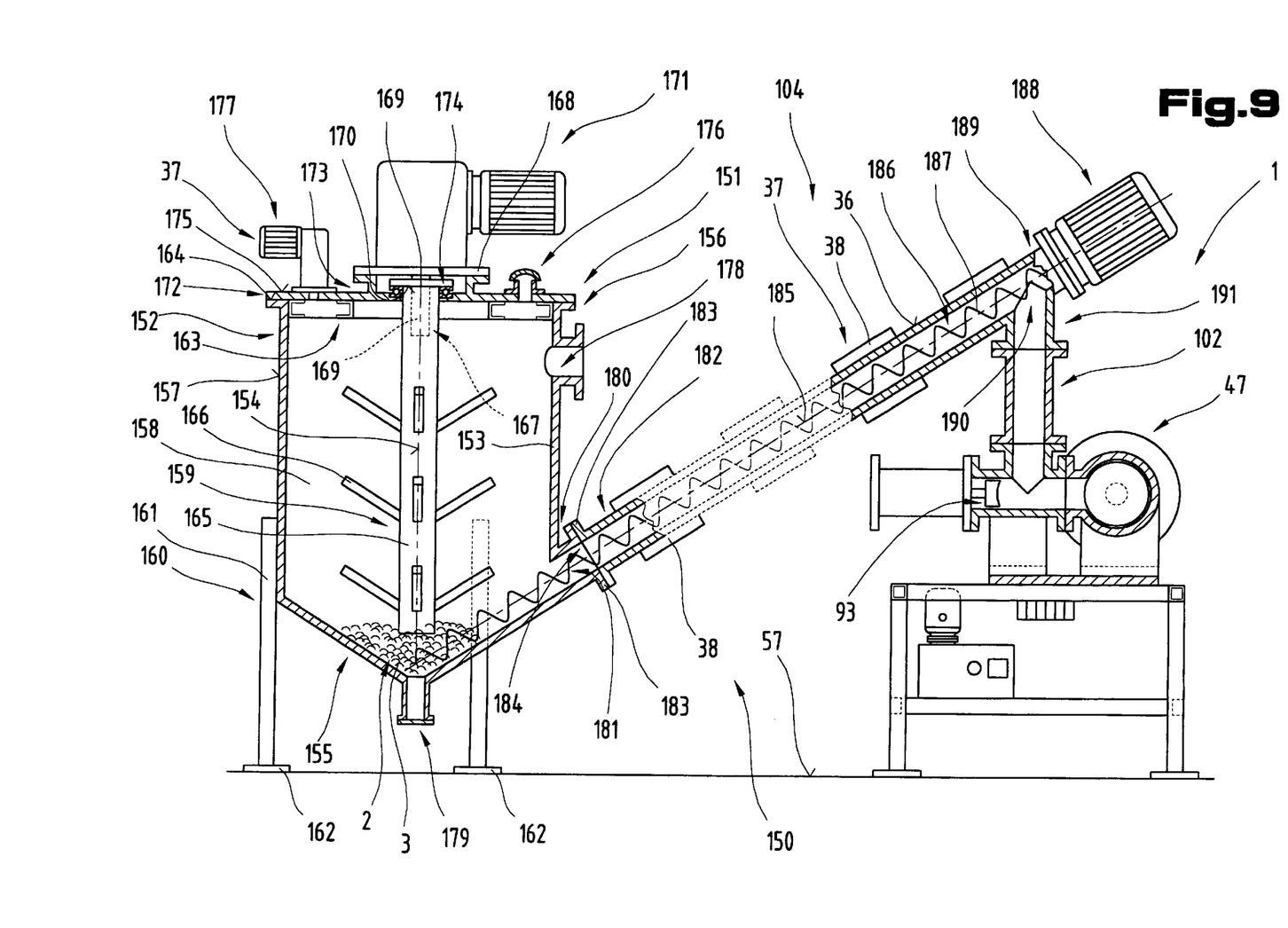
FIG. 9 an arrangement according to the invention, in cross section, in front elevation.

In FIG. 9 an arrangement 150 for compacting material strands 2, in particular shavings 3 made of Fe, Al, Mg or alloys with Fe, Al, Mg is shown. The latter comprises at least one storage device 151 for the shavings 3 and at least one conveyor device 104 and one or more extrusion devices 1. The storage device 151 is designed as a storage container 152 and has a cylindrical casing 153, which is arranged concentrically about a container axis 154 running at right angles to the bearing surface 57.

In the direction of the bearing surface 57 the storage container 152 has a base 155 which is designed to taper conically in the direction of the bearing surface 57. In a region opposite the bearing surface 57 the storage container 152 has a container flange 156, which projects over a casing surface 157 running concentrically around the container axis 154 and delimiting the cylinder casing 153 opposite the container axis 154. The cylinder casing 153 and the base 155 border an inner chamber 158 in which an agitator 159 is arranged. Furthermore, the storage container 152 comprises foot elements 160 which are formed by profiles 161 and foot plates 162 connected securely to the casing surface 157, which are connected to the bearing surface 57 securely and preferably detachably. In the region of the container flange 156 the storage container 152 has reinforcing elements 163, which lie in a common plane with a front face 164 of the container flange 156 parallel to the bearing surface 57.

The agitator 159 comprises a shaft 165 extending at right angles to the bearing surface 57 with a circular cross section. On the outside of the shaft 165 drive rods 166, preferably in the form of profile elements, are arranged and are preferably welded to the shaft 165. In an opposite region to the base 155 the shaft 165 has a shaft pin 167 connected immobily and preferably detachably to the latter, which has two pins 169 extending in opposite direction to a shoulder 168. One pin 169 which projects in the direction of the bearing surface 57, is surrounded by the shaft 165 and, as already mentioned, is connected securely and preferably detachably to the latter. The shoulder 168 runs in a plane parallel to the bearing surface 57 and has a bearing surface 170 facing the bearing surface 57 and parallel to the latter which runs annularly concentrically about the container axis 154.

The pin 169 extending from the shoulder 168 opposite the bearing surface 57 projects into an agitator drive 171, which is designed in particular as an electric motor or hydraulic motor, and which is connected to a disc-shaped lid 172 running parallel to the bearing surface 57, preferably by means of a securing bracket 173. The lid 172 lies on the front face 164 of the container flange 156 and is arranged preferably detachably on the container flange 156. The reinforcing elements 163 are used as a support for the lid 172. In or on the lid 172 a radial bearing 174 is preferably arranged, on which the bearing surface 170 of the shaft pin 167 rests and by means of which the radial bearing 174 is arranged between the shoulder 168 of the shaft pin 167 and the lid 172. On an upper lid side 175 parallel to the bearing surface 57 and opposite the latter there is for example an air removal point 176 and a heating device 37, which for example is in the form of a heater fan 177. In the cylindrical casing 153 a container opening 178 is also arranged which is for supplying the storage container 152 with material strands 2. Lastly, the storage container 152, in particular in a region of the base 155 closest to the bearing surface 57 has a water outlet opening 179.

On the cylinder casing 153 a connection point 180 is arranged which surrounds a container opening 181 and is arranged on the e.g. tubular conveyor housing 182 of the conveyor device 104 by means of flanges 183, so that an intake opening 184 of the conveyor device 104 delimited by the conveyor housing 182 corresponds with the container opening 181. The conveyor housing 182 is, as already described, tubular in design and has a conveyor axis 185, about which the cross section of the conveyor housing 182 is arranged concentrically. The conveyor housing 182 has an outer surface 36 on which one or more heating devices 37, for example heating strips 38 can be arranged. Furthermore, the conveyor device 104 has a conveying means 186 which is surrounded by the conveyor housing 182 and which for example is designed as a coreless spiral screw 187. The latter is rotated by a conveyor drive 188 which in particular is designed as an electric motor or hydraulic motor. The conveyor drive 188 is here preferably arranged in an end region 189 of the conveyor housing 182 opposite the intake opening 184.

In the end region 189 of the conveyor housing 182, in which the conveyor drive 188 is also arranged the conveyor housing 182 has an outlet opening 190 which is surrounded by an outlet connection 191 which is connected to a discharge chute 102, which in turn is connected to the extrusion device 1. The extrusion device 1 is designed according to the previously described figures.

The method for compacting the material strands 2, in particular the shavings 3 of Al, Mg, or alloys with Fe, Al, Mg is now described with reference to the arrangement 150.

The shavings 3 are preferably stored in a loose state in one area, in particular in storage containers 152, and conveyed by the conveyor device 104 into a different area after which compaction occurs. During the conveying the shavings 3 are heated and predried, e.g. in the storage container 152 or in the conveyor device 104. The compaction takes place in stages in the extrusion device 1, whereby in the first compaction stage, i.e. in the preextrusion die 48, in which heating can also occur, the shavings 3 are pressurised by prepressure and moved into the second compaction stage, i.e. the main extrusion die 47. In this second compaction stage the shavings 3 are pressurised with a main pressure, whereby with the additional effect of heat a homogenous bonding occurs due to the plastification of the shavings 3, and the formed material strand 2 is cut up after the plastification by means of the size reducing device 39 shown in FIG. 1. The prepressure force is about 20 kN to 100 kN and the main pressure force 490 kN to 1480 kN. The second compaction stage is performed, in particular when the first compaction stage is in the compression state, i.e. when the preextrusion stamp 93 is in the position shown by broken lines closest to the main extrusion die 47.

Figure 10:
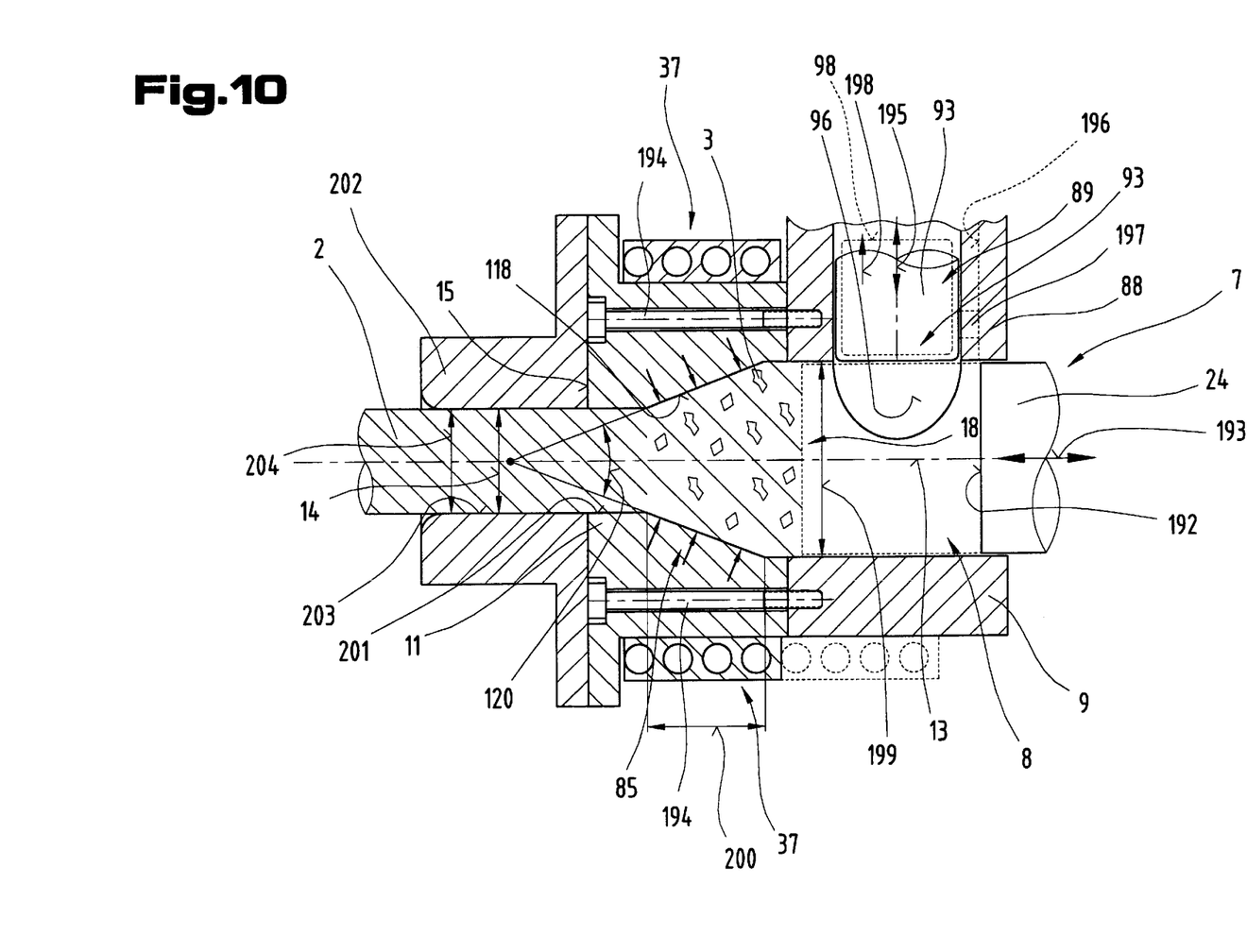
FIG. 10 a detailed view of the die housing of the extrusion device according to the invention with the mould cavity and the extrusion die forming the compression channel, in cross section.

FIG. 10 shows the die housing 9 with the mould cavity 8 and the compression channel 18 arranged opposite the front face 192 of the extrusion element 7, e.g. the main extrusion stamp 24, in the extrusion die 11. In the mould cavity 8 the main extrusion stamp 24, according to a double arrow 193—is adjustably mounted in the direction of the longitudinal middle axis 13 and is activatable by the already described drive device 6. The extrusion die 11 is secured to the die housing 9 preferably by screws 194, which extrusion die has a conical section 85 concentric to the longitudinal middle axis 13 forming the compression channel 18. By means of the two part design of the die housing 9 and the extrusion die 11 a separation of differently stressed components is achieved and an inexpensive replacement of the extrusion die 11 subjected to greater wear is made possible. As also illustrated the heating device 37 is arranged surrounding the extrusion die 11 and the compression channel 18, as it is also possible of course to design the heating device 37 so that the die housing 9 forming the mould cavity 8 is heated from the outside, as shown by broken lines.

Approximately at right angles to the longitudinal middle axis 13 via the inlet opening 98 the preextrusion cavity 89 opens into the die housing 9, in which the preextrusion stamp 93 is adjustably mounted—according to a double arrow 195—by a further drive device 6, as already described. The mould cavity 8 and the preextrusion cavity 89 have a cylindrical cross section of equal size. The pressing surface 96 facing the mould cavity 8 of the preextrusion stamp 93 is semi-circular and designed to fit the cross section of the mould cavity 8, and the preextrusion stamp 93 in the preextrusion housing 88 is guided rotation-fast by springs 197, e.g. engaging in a guide groove 196 running in longitudinal direction.

To produce the homogenous material strand 2 from the shavings 3 the sequence in the region of the mould cavity 8 and the compression channel 18 is as follows. The preextrusion stamp 93 is moved by the drive device in the direction of an arrow 198 until the inlet opening 98 drawn by broken lines is released and the shavings 3 by means of gravity fill the preextrusion hollow cavity 89. The main extrusion stamp 24 is here located in the end position shown by solid lines, in which the mould cavity 8 is released. Afterwards the preextrusion stamp 93 is moved into the position shown by solid lines in which the pressing surface 96 due to its concave design forms the enveloping surface of the mould cavity 8 and with this movement a precompaction of the shavings 3 in the mould cavity 8 is performed. Whilst now the preextrusion stamp 93 remains in this position a movement of the main extrusion stamp 24 is performed in the direction of the compression channel 18, in which by the effect of pressure and temperature and due to the conically running casing surface 118 a crucial compaction process of the shavings 3 occurs which effects the homogenous structure of the material strand 2. Depending on the material of the shavings 3 a conical angle 120 is selected, which is formed by the difference of a diameter 199 of the mould cavity 8 and the die inner diameter 14 and a length 200 of the conical section 85. In a specific example for the production of the material strand 2 from compacted shavings 3 of magnesium the conical angle is 120° preferably 16°. The preferred temperature for obtaining the homogenous material strand 2 is approximately 300° C. to 450° C.

As also shown in FIG. 10 it is advantageous to arrange an approximately cylindrical guide bore 201 on the conical section 85 in the extrusion die 11 which is coaxial to the longitudinal middle axis 13. It is advantageous, if this guide bore 201 widens conically slightly from the die inner diameter 14 in the direction of the passage surface 15. To stabilise the material strand 2 emerging from the extrusion die 11 a guide casing 202 with a through bore 203 is detachably connected with the extrusion die 11 which bore is slightly larger than an external diameter 204 of the material strand 2. The conical widening of the guide bore 201 with a corresponding guiding of the material strand 2 reduces the frictional forces and in the guide casing 202 adjoining the extrusion die 11 the material strand 2 is already cooled.

Of course, it is possible to combine individual details of embodiments shown in the figures in different way than in the shown embodiments.

In addition, details of the embodiments or combinations thereof can also represent the subject matter of independent inventions.

Lastly, it is noted that the embodiments shown in the Figures are not drawn to scale.

List of Reference Numbers 1. extrusion device
2. material strand
3. shaving
4. extrusion unit
5. extrusion die
6. drive device
7. extrusion element
8. mould cavity
9. die housing
10. main extrusion housing
11. extrusion die
12. die opening
13. longitudinal middle axis
14. die inner diameter
15. passage surface
55. vertical profile
16. cross sectional surface
17. main extrusion cavity
18. compression channel
19. housing section
20. flange
21. flange front face
22. hydraulic cylinder
23. cylinder rod
24. main extrusion stamp
25. main extrusion die
26. die external diameter
27. flange external diameter
28. inlet opening
29. opening axis
30. inlet channel
31. inlet connection
32. inlet diameter
33. connection flange
34. connection outer face
35. stamp diameter
36. outer surface
37. heating device
38. heating strip
39. size reducing device
40. leading element
41. guide we
42. guide rail
43. adjusting device
44. frame
45. profile element
46. bearing plate
47. main extrusion die
48. preextrusion die
49. sliding surface
50. front surface
51. arrow
52. line of intersection
53. longitudinal middle plane
54. spacing
56. foot plate
57. bearing surface
58. spacing
59. connecting profile
60. horizontal profile
61. upper side
62. frame height
63. plate thickness
64. bearing plane
65. bracket
66. bracket plate
67. spindle nut
68. internal thread
69. spindle axis
70. reinforcing plate
71. plate front face
72. rail surface
73. spindle
74. drive element
75. handwheel
76. end region
77. storage device
78. guide bracket
79. transverse plate
80. inner side
81. reinforcing rib
82. plate
83. opening
84. extrusion moulding
85. conical section
86. cylindrical section
87. foot bracket 88. preextrusion housing
89. preextrusion cavity
90. middle axis
91. flange
92. hydraulic cylinder
93. preextrusion stamp
94. cylinder diameter
95. cross sectional diameter
96. pressing surface
97. radius
98. inlet opening
99. bore axis
100. inlet connection
101. inlet flange
102. discharge chute
103. outlet opening
104. conveyor device
105. foot bracket
106. power supply device
107. hydraulic unit
108. line
109. control device
110. switching element
111. hydraulic valve
112. transport device
113. side surface
114. width
115. surface
116. front side surface
117. guide surface
118. casing surface
119. tangential line
120. cone angle
121. conveyor housing
122. outlet connection
123. preextrusion die
124. cylinder casing surface
125. casing diameter
126. shoulder
127. shoulder diameter
128. connection inner surface
129. shaping
130. shoulder surface
131. annular surface
132. depth
133. shoulder width
134. shoulder front face
135. flange front face
136. die opening
137. cylinder section
138. conical section
139. inclined channel
140. channel axis
141. section diameter
142. die inner diameter
143. channel diameter
144. inner diameter
145. screw
146. external diameter
147. screw axis
148. coupling and/or storage device
149. cylindrical gear motor
150. arrangement
151. storage device
152. bearing container
153. cylinder casing
154. container axis
155. base
156. container flange
157. casing surface
158. inner chamber
159. agitator
160. foot element
161. profile
162. foot plate
163. reinforcing element
164. front face
165. shaft
166. drive rod
167. shaft pin
168. shoulder
169. pin
170. bearing surface
171. agitator drive
172. lid
173. securing bracket
174. radial bearing
175. upper lid side
176. ventilation opening
177. heater fan
178. container opening
179. water outlet opening
180. connection point
181. container opening
182. conveyor housing
183. flange
184. intake opening
185. conveyor axis
186. conveyor means
187. spiral screw
188. conveyor drive
189. end region
190. outlet opening
191. outlet connection
192. front face
193. double arrow
194. screw
195. double arrow
196. guide groove
197. spring
198. arrow
199. diameter
200. length
201. guide bore
202. guide casing
203. through bore
204. external diameter

What is claimed is:

1. Extrusion device for compacting metal shavings to form homogenous extrusion mouldings, with at least one extrusion unit with an extrusion die formed by a die housing, which forms a mould cavity, a guide arrangement for an extrusion element adjustable by a drive device, and with an inlet opening for the shavings in the die housing, characterised in that an extrusion die forming a conically tapering compression channel with a die opening forming a passage surface for a material strand is arranged opposite an outside face of the extrusion element facing the mould cavity and adjacent to the mould cavity, and the passage surface is smaller than a cross sectional surface of the mould cavity, wherein the extrusion die is designed as a preextrusion die and further comprising a further extrusion die as a main extrusion die, and wherein the preextrusion die has a preextrusion cavity forming the mould cavity, said mould cavity being at least partially delimited by a preextrusion housing forming said die housing, and further comprising heating devices arranged on at least one of the outer surfaces of the preextrusion housing and main extrusion housing.

2. Extrusion device according to claim 1, characterised in that the passage surface is between 20% and 80%, of the cross sectional surface of the mould cavity.

3. Extrusion device according to claim 1, characterised in that the length of the compression channel is between 20 mm and 80 mm.

4. Extrusion device according to claim 1, characterised in that in the preextrusion cavity a preextrusion stamp forming the extrusion element is mounted linearly movably along a middle axis of the preextrusion die.

5. Extrusion device according to claim 4, characterised in that the preextrusion stamp is cylindrical in design and has a cylindrical diameter, which corresponds approximately to a cross sectional diameter of a cross sectional surface of the preextrusion cavity.

6. Extrusion device according to claim 1, characterised in that the cross sectional diameter of the preextrusion cavity is greater than a die inner diameter of the preextrusion die.

7. Extrusion device according to claim 4, characterised in that the preextrusion stamp has a concave pressing surface.

8. Extrusion device according to claim 1, characterized in that the preextrusion housing has an inlet opening, which has a bore axis which is arranged at right angles to a middle axis of the preextrusion die.

9. Extrusion device according to claim 1, wherein the preextrusion housing has an outflow opening.

10. Extrusion device according to claim 8, characterised in that on the inlet opening an discharge chute of a conveyor device is arranged.

11. Extrusion device according to claim 1, characterised in that the main extrusion die has a main extrusion cavity forming the mould cavity, which is at least partly bordered by the die housing.

12. Extrusion device according to claim 11, characterised in that in the main extrusion cavity, the main extrusion element is mounted linearly movably along a longitudinal middle axis of the main extrusion die.

13. Extrusion device according to claim 12, characterised in that the main extrusion element is cylindrical and has a stamp diameter which corresponds approximately to a cross section of the cross sectional surface of the main extrusion cavity and which is greater than a die inner diameter delimiting the die opening of the main extrusion die.

14. Extrusion device according to claim 13, characterised in that a concave pressing surface of a preextrusion stamp forming the extrusion element has a radius which corresponds to half the stamp diameter of the main extrusion element and half the cross section of the main extrusion cavity.

15. Extrusion device according to claim 1, charcterised in that a guide bore is concentric to the opening inner diameter adjoining the latter, which guide bore widens conically from the die opening.

16. Extrusion device according to claim 1, characterised in that on the extrusion die a guide casing with a through bore is arranged, and the cross section of the through bore is slightly greater than the cross section of the material strand.

17. Extrusion device according to claim 1, characterised in that the main extrusion die has a main extrusion housing whose inlet opening has an axis which is art right angles to a longitudinal middle axis of the mould cavity.

18. Extrusion device according to claim 17, characterised in that the main extrusion housing has at least one outflow opening.

19. Extrusion device according to claim 1, characterised in that the heating devices are formed by at least one electrical heating strip, and are arranged in a housing section between the main extrusion die and the inlet opening.

20. Extrusion device according to claim 1, characterised in that a size reducing device is arranged spaced apart from a front surface delimiting the main extrusion die opposite the drive device in the main extrusion direction.

21. Extrusion device according to claim 20, characterised in that the size reducing device has a sliding surface facing the front surface and running at an angle to the main extrusion direction.

22. Extrusion device according to claim 1, characterised in that the die opening of the main extrusion die is arranged symmetrically about a longitudinal middle axis of the mould cavity.

23. Extrusion device according to claim 1, characterised in that the extrusion element is a conical screw with a screw spindle forming a core.

24. Extrusion device according to claim 23, characterised in that an external diameter of the screw decreases in the direction of the inlet opening.

25. Arrangement for compacting metal shavings made of Al, Cu, Mg or alloys of these elements or other low melting metals or their alloys, with at least one conveyor device for the shavings arranged in a storage device, which conveyor device is connected with an extrusion device, which comprises at least one extrusion unit, each unit having extrusion dies and extrusion elements adjustable relative thereto by drive devices, characterised in that the extrusion dies have cylindrical cavities which are delimited at least partly by the die housings and a bore axis of a preextrusion housing mounting a preextrusion stamp is arranged at right angles to a middle axis of a main extrusion die, and at least one die housing has an extrusion die arranged opposite the drive device, which extrusion die forms a conically tapering compression channel with a die opening having a passage surface which is smaller than a cross sectional surface of the die cavity, wherein one of the extrusion dies is designed as a preextrusion die and a further one of the extrusion dies is designed as a main extrusion die, and wherein the preextrusion die has a preextrusion cavity forming the mould cavity, said preextrusion cavity being at least partially delimited by the preextrusion housing forming the die housing, and further comprising heating devices arranged on the outer surfaces of at least one of the preextrusion housing and a main extrusion housing.

26. Arrangement according to claim 25, characterised in that the storage device is made of a storage container and an agitator arranged rotatably in the latter, activated by means of an agitating drive.

27. Arrangement according to claim 26, characterised in that the agitating drive comprises a motor.

28. Arrangement according to claim 26, characterised in that the storage container has a container opening, which is connected by a blocking element to an intake opening of the conveyor device.

29. Arrangement according to claim 28, characterised in that the conveyor device has a conveyor housing, and in the end region of the conveyor housing a discharge chute is arranged, which is connected to the inlet opening.

30. Extrusion device according to claim 2, characterised in that the passage surface is between 40% and 60% of the cross sectional surface of the mould cavity.

31. Extrusion device according to claim 3, characterised in that the length of the compression channel is between 40 mm and 60 mm.

32. Extrusion device according to claim 12, characterised in that the die inner diameter is from 30 mm to 80 mm.

* * * * *